United States Patent
Black

(10) Patent No.: US 7,144,197 B2
(45) Date of Patent: Dec. 5, 2006

(54) APPARATUS AND METHOD FOR CONTROLLING WAVE CHARACTERISTICS

(75) Inventor: Kerry Peter Black, Raglan (NZ)

(73) Assignee: Surf Pools Limited, Hamilton (NZ)

( * ) Notice: Subject to any disclaimer, the term of this patent is extended or adjusted under 35 U.S.C. 154(b) by 0 days.

(21) Appl. No.: 10/512,905

(22) PCT Filed: May 2, 2003

(86) PCT No.: PCT/NZ03/00079

§ 371 (c)(1),
(2), (4) Date: Apr. 9, 2005

(87) PCT Pub. No.: WO03/092460

PCT Pub. Date: Nov. 13, 2003

(65) Prior Publication Data

US 2005/0226687 A1    Oct. 13, 2005

(30) Foreign Application Priority Data

May 2, 2002    (NZ) ................................. 518731

(51) Int. Cl.
*E02B 3/00*    (2006.01)
(52) U.S. Cl. .......................................... 405/79; 405/76
(58) Field of Classification Search ................ 405/21, 405/76, 77, 79; 60/495, 497, 502, 505; 290/53
See application file for complete search history.

(56) References Cited

U.S. PATENT DOCUMENTS

| | | | | |
|---|---|---|---|---|
| 799,708 A | * | 9/1905 | Boyce | 405/21 |
| 3,085,404 A | * | 4/1963 | Smith | 405/26 |
| 3,557,559 A | * | 1/1971 | Barr | 405/79 |
| 3,611,727 A | * | 10/1971 | Blandford | 405/79 |
| 3,851,476 A | * | 12/1974 | Edwards | 405/25 |
| 4,142,258 A | * | 3/1979 | Schiron et al. | 4/491 |
| 4,332,506 A | * | 6/1982 | Andrews | 405/77 |
| 4,549,837 A | * | 10/1985 | Hebert | 405/101 |
| 5,913,636 A | | 6/1999 | Macaulay | |
| 6,019,547 A | * | 2/2000 | Hill | 405/79 |
| 6,336,771 B1 | * | 1/2002 | Hill | 405/79 |
| 2003/0106146 A1 | | 6/2003 | Black | |

FOREIGN PATENT DOCUMENTS

| | | | | |
|---|---|---|---|---|
| EP | 0 353 833 | | 2/1990 | |
| FR | 2548738 | * | 1/1985 | 405/76 |
| JP | 05346070 | * | 12/1993 | 405/79 |
| WO | WO01/42592 | | 6/2001 | |

* cited by examiner

*Primary Examiner*—Frederick L. Lagman
(74) *Attorney, Agent, or Firm*—Henricks, Slavin & Holmes

(57) ABSTRACT

The present invention relates to a variable floor (1) for a body of water, the variable floor (1) including a base portion (2) for location on or within a fixed floor (106) of the body of water and means to adjust the slope of the upper surface of the variable floor (1) relative to the fixed floor (106) or base portion (2) in one or both of a first direction transverse to the direction of travel of waves and in a second direction transverse to the first direction. A wavepool (100) incorporating the variable floor (1) and including variable converging side walls, a kit of parts for the variable floor (1) and a method of controlling wave characteristics is also described.

42 Claims, 3 Drawing Sheets

APPARATUS AND METHOD FOR CONTROLLING WAVE CHARACTERISTICS

CROSS REFERENCE TO RELATED APPLICATIONS

This application is a National Stage of International Application No. PCT/NZ2003/00079, filed May 2, 2003.

TECHNICAL FIELD

The present invention relates to apparatus and methods for controlling wave characteristics. In particular, but not exclusively, the present invention relates to a wave pool for generating and propagating surfing waves and a method for controlling characteristics of surfing waves.

BACKGROUND TO THE INVENTION

Wave pools are a relatively recent development in water recreation that provide a new controlled adventure sport for surfing enthusiasts and other people who require waves for recreation. The quality of the experience is often dictated by the characteristics of the waves, the number of waves utilised and the variety of waves. Similarly, the characteristics of surf waves at a beach often dictate the quality of the recreational experience.

Characteristics of waves that are important as influencing the experience of the rider include the way that the wave breaks, peel angle and wave surfing speed. Different riders may require different wave characteristics depending on their experience, skill level and preferences.

It is an object of the present invention to provide a floor for body of water, a wave pool and/or a method of controlling wave characteristics that allows controlled modification of waves, or at least to provide the public with a useful alternative.

Further objects of the present invention may become apparent from the following description.

SUMMARY OF THE INVENTION

According to one aspect of the present invention, there is provided a floor for a body of water, the floor including a base portion for location on or within a fixed floor of the body of water, an upper surface opposing said base portion and means to adjust the slope of said upper surface relative to said fixed floor or base portion in both a first direction and in a second direction transverse to the first direction.

Preferably, the second direction is substantially parallel to an expected direction of travel of waves over said upper surface.

Preferably, the upper surface is formed by a plurality of segments and the means to adjust the slope of said upper surface is operable to adjust the slope along one or both of said first and second directions for portions of the upper surface by changing the relative height of said segments.

Preferably, the upper surface is formed by a grid of plates having a square or triangular shape.

Preferably, each segment is linked to adjacent segments by a pivotal linkage.

Preferably, the operation of the means to adjust the slope of said upper surface is controlled by a controller and wherein the controller is programmed to control said means to adjust the slope of said upper surface to provide a selected floor profile from a plurality of predetermined floor profiles.

Preferably, each segment has a density less than water.

Preferably, the means to adjust the slope of said upper surface is operable to create local variations in the slope of the floor by adjusting the height of individual segments or groups of segments.

Preferably, the floor includes an elastic sheet covering said upper surface, wherein the elastic sheet conforms to the shape of the upper surface.

Preferably, the elastic sheet is formed by or covers an impact-absorbing material.

Preferably, the upper surface includes a heat insulating material.

Preferably, water can travel through the upper surface and the floor includes walls below the upper surface that compartmentalise the area below the upper surface.

According to another aspect of the present invention, there is provided a wave pool including a floor as described in the immediately preceding paragraphs.

Preferably, the wave pool includes side walls able to be oriented so as to converge in the direction of travel of waves within the wave pool.

Preferably, the wave pool includes means to adjust the rate of convergence of the side walls.

Preferably, the means to adjust the slope of said upper surface and the means to adjust the rate of convergence of the side walls are both operable under the control of a controller, the controller including in memory a number of pre-set configurations for the floor and side walls.

Preferably, the wave pool includes a wave generator operable to generate waves that travel over the floor, wherein the wave generator is controllable to generate varying wave sizes.

According to another aspect of the present invention, there is provided a kit of parts suitable for assembly to form a floor of a body of water, the kit of parts including a plurality of plates for collectively defining an upper surface of the floor, locating means to locate the plates above a base and adjusting means for the locating means to enable adjustment of the overall slope of the upper surface relative to the base in a first direction and in a second direction transverse to the first direction.

Preferably, in the kit of parts, the adjusting means is automatically operable and remotely controllable and wherein the kit of parts may further include a controller to remotely control the adjusting means.

According to another aspect of the present invention, there is provided a method of controlling wave characteristics in a body of water, the method including providing a floor for the body of water that has an upper surface that is controllably variable in slope in both a first direction and a second direction transverse to the first direction and adjusting the slope of said upper surface along said first and second directions as required to effect particular wave characteristics.

Preferably, the method includes effecting particular wave characteristics by identifying a required slope substantially along the expected direction of travel of waves over the floor and substantially transverse to the expected direction of travel of waves over the floor and adjusting the slope of said upper surface to achieve the identified slopes.

Preferably, the body of water is a wave pool and the method includes providing moveable side walls that converge in the direction of travel of waves in the wave pool and adjusting the rate of convergence of the side walls as required to effect particular wave characteristics.

Preferably, the floor is constructed from a grid of controllably movable floor segments and the method further includes adjusting the relative height of the floor segments to create local variations in slope in the pool floor to effect a change in wave characteristics proximate the local variations in slope in the pool floor.

Preferably, the method further includes providing adjustment means for the upper surface that is automatically and remotely controllable and controlling the adjustment means by a controller having a number of predetermined floor profiles stored in a memory.

According to another aspect of the present invention, there is provided a wave pool including a floor having an upper surface and means to adjust the slope of said upper surface in a direction having a substantial component transverse to the direction of travel of waves within the wave pool.

Preferably, the wave pool includes moveable side walls able to be oriented so as to converge in the direction of travel of waves in the wave pool and means to adjust the rate of convergence of the side walls.

Preferably, the floor is constructed from a grid of controllably movable floor segments and the means to adjust the slope of said upper surface is operable to adjust the relative height of the floor segments to create local variations in slope in the pool floor.

According to another aspect of the present invention, there is provided a method of controlling wave characteristics in a body of water, the method including providing a floor for the body of water that has an upper surface that is controllably variable in slope in at least a first direction having a substantial transverse component to the direction of travel of waves in the body of water and adjusting the slope of said upper surface in said first direction as required to effect particular wave characteristics.

Preferably, the body of water is a wave pool and the method includes providing moveable side walls that converge in the direction of travel of waves in the wave pool and adjusting the rate of convergence of the side walls as required to effect particular wave characteristics.

Preferably, the floor is constructed from a grid of controllably movable floor segments and the method further includes adjusting the relative height of the floor segments to create local variations in slope in the pool floor to effect a change in wave characteristics proximate the local variations in slope in the pool floor.

Further aspects of the present invention, which should be considered in all its novel aspects, may become apparent from the following description, given by way of example only and with reference to the accompanying drawings.

MODES FOR CARRYING OUT THE INVENTION

Figure 1:
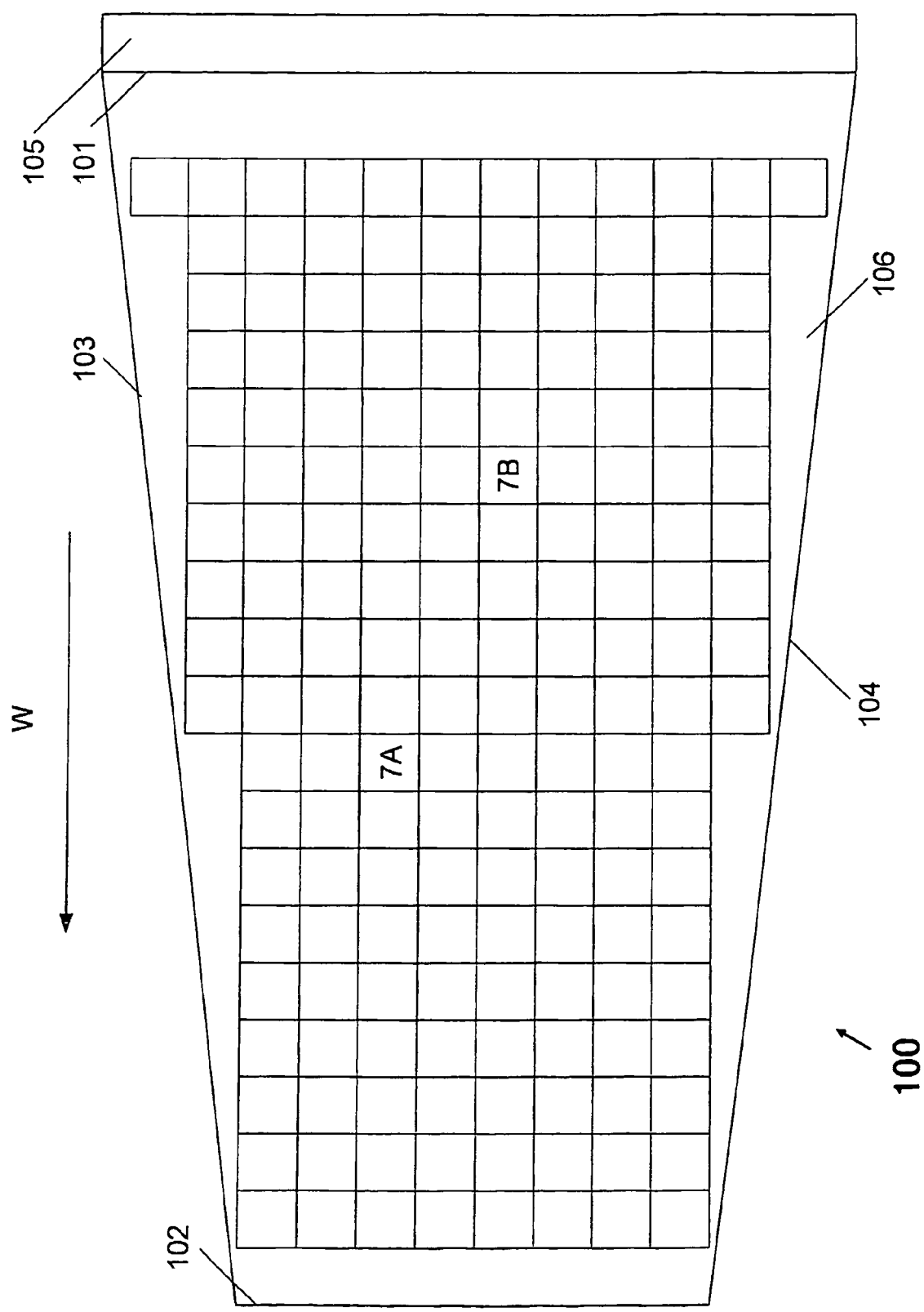
FIG. 1: Shows a schematic plan view representation of a wave pool including a wave pool floor according to an aspect of the present invention.

The present invention relates to a variable floor for a body of water for use in controlling characteristics of waves travelling through the body of water. The invention may have particular application to wave pools. Variations of the overall slope of the variable floor in the direction of travel of waves and in the direction transverse to the direction of travel of waves may be achieved and may be particularly useful to control wave characteristics.

The present invention may be used to provide a wave pool as described in the specification of international patent publication no. WO 01/42592, the contents of which are hereby incorporated herein where appropriate. The present invention may have application to allowing for increased control over the wave characteristics over the pool described in WO 01/42592. Although the following description has been given primarily in relation to the implementation of the present invention in a wave pool, the present invention may also have application to controlling wave characteristics approaching a sea or a lake shore.

Referring to the accompanying drawings, in which like numbered references are used to refer to like components unless specifically stated otherwise, schematic representations of a wave pool, generally referenced by arrow 100 are shown. The wave pool 100 includes two end walls 101 and 102 and two side walls 103 and 104. Waves are generated by a wave generator 105 at end wall 101 and travel along the wave pool 100 in the direction indicated by arrow W. The side walls 103, 104 may converge towards end 102.

The wave pool may have a fixed floor 106. Above the fixed floor 106 is located a variable floor, generally referenced 1. The variable floor 1 includes a base portion 2, which is located on or within the fixed floor 106. The base portion 2 may be of any shape suitable to provide support for the variable floor 1 and locate the variable floor 1 above the fixed floor 106. The base portion, which may be the base of each leg 3 or a base plate secured to the legs 3 may bolt to the fixed floor 106 or be on rails to give them structural strength and stability against the wave impact forces.

Figure 2:
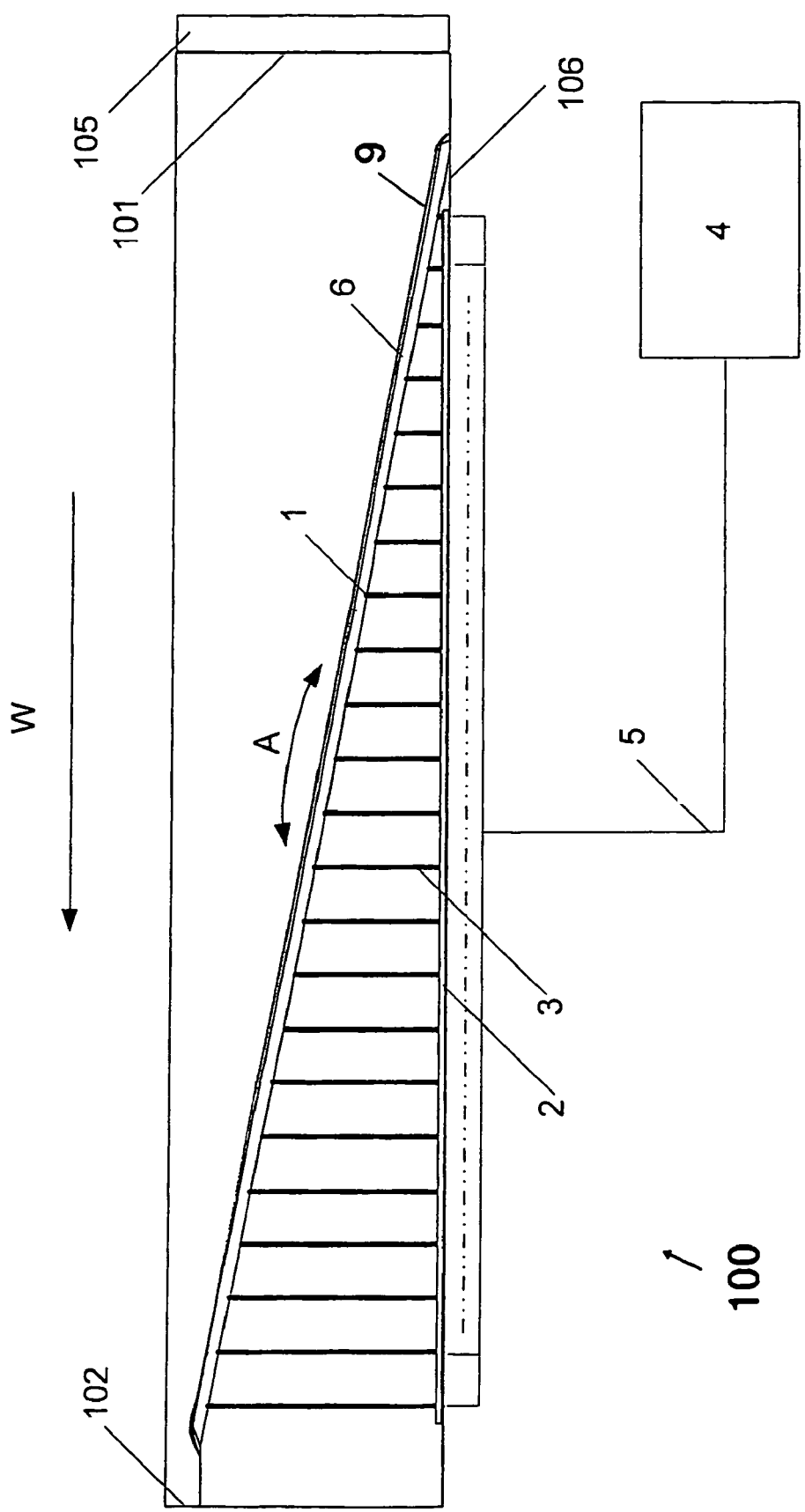
FIG. 2: Shows a schematic side view representation of the wave pool of FIG. 1.

Referring particularly to FIG. 2, the variable floor 1 may be supported by a number of controllably adjustable legs, one of which is referenced by numeral 3. The adjustment could be achieved by a number of means, either manual or automatic such as through the use of threaded sections, bolted sections with multiple positions, or hydraulics on the unit legs.

The variable floor 1 may be located within an existing wave pool provided the pool has the necessary depth. The accompanying Figures show a variable floor 1 provided for a flat-floored wave pool. However, the existing floor of the wave pool may already have a profile that is not flat, in which case changes to the length of selected legs 3 may be made to accommodate the profile.

The operation of each leg 3 may be automatic and controlled by a controller 4 through a suitable communication means 5, allowing remote control of the legs 3. The automatic operation may achieved, for example, through hydraulics or by an electric motor to turn a shaft of the legs 3 about a threaded section, in which case the communication means 5 may be electrical wires or optical cables. The controller 4, which may be microprocessor or microcontroller based, may have a number of predetermined configurations for the legs 3 in memory so that a user can select one of the configurations to provide a specific profile of the variable floor 1. If the floor is used in a wave pool, the configurations may advantageously be selected to define a substantially constant volume within the pool, avoiding the need to evacuate or add water for each change in configuration and therefore more readily allowing configuration changes.

For safety reasons, the variable floor 1 may be covered by a soft "impact" bag 6, which could be made of a number of different materials. The material selected for use in covering the floor should absorb impact forces against it and be sufficiently flexible to conform to the shape of the upper surface 1. Those experienced in the relevant arts will know that there are many materials that would be suitable for this purpose.

Referring particularly to FIG. 1, the variable floor 1 may be segmented into a plurality of sections, two of which are referenced by plates 7A and 7B. Each segmented section may have an independently adjustable leg 3 supporting and locating it. As shown in FIG. 1, the segmented sections may be plates having a generally square shape arranged in a grid pattern. However, other shapes may be used such as rectangular or triangular plates arranged into a grid. Each plate may be fixedly engaged with its corresponding leg 3 or alternatively pivotally engaged with its corresponding leg 3. More or less plates or other segments may be provided, as required. In one embodiment as presently contemplated, each plate may have sides of approximately 2 m in length. In a simpler embodiment the variable floor may have only a single plate, which is not necessarily flat, that can be controllably tilted along two axes, which may be preferably central to the floor in order to maintain a constant volume above the floor. Whether a single plate is provided as a floor or a segmented floor is used, the slope in the direction of travel of the waves may be selected to remain constant and only the slope transverse to the direction of travel of the waves varied. However, this embodiment is viewed as less advantageous, as it reduces the degrees of freedom available to produce waves of varying characteristics.

Two of the more important variables of the variable floor 1 to be controlled will be the overall slope of the floor relative the surface of the water along the wave pool 100 and across the wave pool 100. The variable floor 1 may rise along the direction of travel, W of the waves. The overall rate of the rise may be controlled by varying the length of legs 3. This variation in the slope along the wave pool 100 is represented by arrow A in FIG. 2. In addition the variable floor is configurable to have an overall slope across the wave pool 100. In the accompanying Figures the slope across the pool is shown as zero, but by changing the length of the legs 3, the variable floor may have any reasonably required slope across the pool in either direction, as indicated by arrow B in FIG. 3.

The gradients of the variable floor 1 may vary from horizontal to up to about 1:1, in any direction in the pool. The variable floor 1 may cover the whole pool 100 or just a section to create a local wave breaking character that is exceptional.

Typically, the variable floor 1 will rise in the direction along the pool so as to create wave shoaling and eventual breaking. The variable floor 1 will rise across the pool to create refraction and depth differences so that the waves break in a peeling fashion. That is, one section of the wave breaks much sooner (on the shallow side) than other sections and this continues down the pool. By this method, a surfer is presented simultaneously with a broken and unbroken wave face, allowing the surfer to perform manoeuvres and to "surf the shoulder", as in the ocean. The shoulder is the steep part of the unbroken wave adjacent to the breaking section.

The slope of the variable floor 1 along and across the pool need not be constant. For example, portions having increased gradient may be provided to change the characteristics of waves passing over that portion. Individual plates or groups of plates may be raised or lowered to achieve the localised change in gradient. The first plates to receive the waves from end 101 may be used to provide a transition between a portion of the fixed floor 106 that is next to the wave generator 105 and the remainder of the variable floor 1. Those skilled in the relevant arts will appreciate that a large number of floor profiles are possible and may be used depending on the required characteristics of waves travelling over the pool floor.

The plates may be pivotally linked together with brackets (not shown) to provide further stability to the structure against the force of the waves. With joined plates, only selected plates may have a leg 3 attached. The brackets and plates would then span the height distance between adjacent legs 3. As stated herein above, the plates may be pivotally engaged to their corresponding leg 3 to assist in spanning the gap between legs and provide a smoother upper surface.

In another embodiment, the variable floor may be formed from a plurality of floating segments, made of an impermeable substance, for example a suitable plastics material and filled with buoyant material, for example foam. The segments would be joined with loose brackets at their corners to create a continuous carpet of floating units to make a floor. The segments in this embodiment may be triangular in shape, although other shapes may be used if required. The plastic units may be covered on their upper surface by an impact-absorbing material for safety. The floor may assist to insulate the pool from heat losses.

To control the underwater level of the variable floor having floating units, there may be a series of cables (instead of legs 3) that join to the corners of the segments. These would go vertically to the fixed pool floor 106 and then through a series of pulleys out through the pool wall and up into a controlling room. In this embodiment, the communication means 5 is the cables. Each cable would be placed on a winch which would be, in turn, controlled by a stepper motor. Such a motor can be controlled by a computer while the stepper counts the number of rotations of the winch. By calibration of the winch and wire lengths, accurate movements of the pool floor can be made by forward or reverse rotations of the winch. The winches would pull the floor downwards underwater against the forces of buoyancy that would be acting to cause the floor to float.

To prevent undue stresses on any individual cable, the whole system would be controlled by a computer which would simultaneously log the winch movements and calculate the floor adjustments. For example, large movement of one wire, without simultaneous adjustment of nearby wires, could lead to high stress on the wire and breaking. Stress on the legs 3, if used, should also be addressed, particularly if areas of large slope or large changes in slope are required.

The software to control the winches (or legs or other suitable mechanism for adjusting the floor profile) would include a variety of pool floor shapes that could be created by user selection of a pool floor option and subsequent adjustment of the pool floor shape by computer control. For example, some options would be for soft breaking waves on low gradient pool, while others would be for steeper pool sections.

A stretchable membrane 9 (see FIG. 2), which may be rubber or a modern elastic plastic may be provided to cover the pool floor, covering the soft "impact" bag 6 if one is provided. The stretchable membrane 9 may itself form an impact absorbing layer if a suitable material such as rubber of sufficient thickness was used. The particular material selected for the stretchable membrane 9 will typically represent a trade-off between robustness and resilience/elasticity. The stretchable membrane 9 may be attached to the floor or walls of the wave pool 100 at the edges, and then stretched into a shape required for the reef by buoyant objects or legs under the stretch material.

Figure 3:
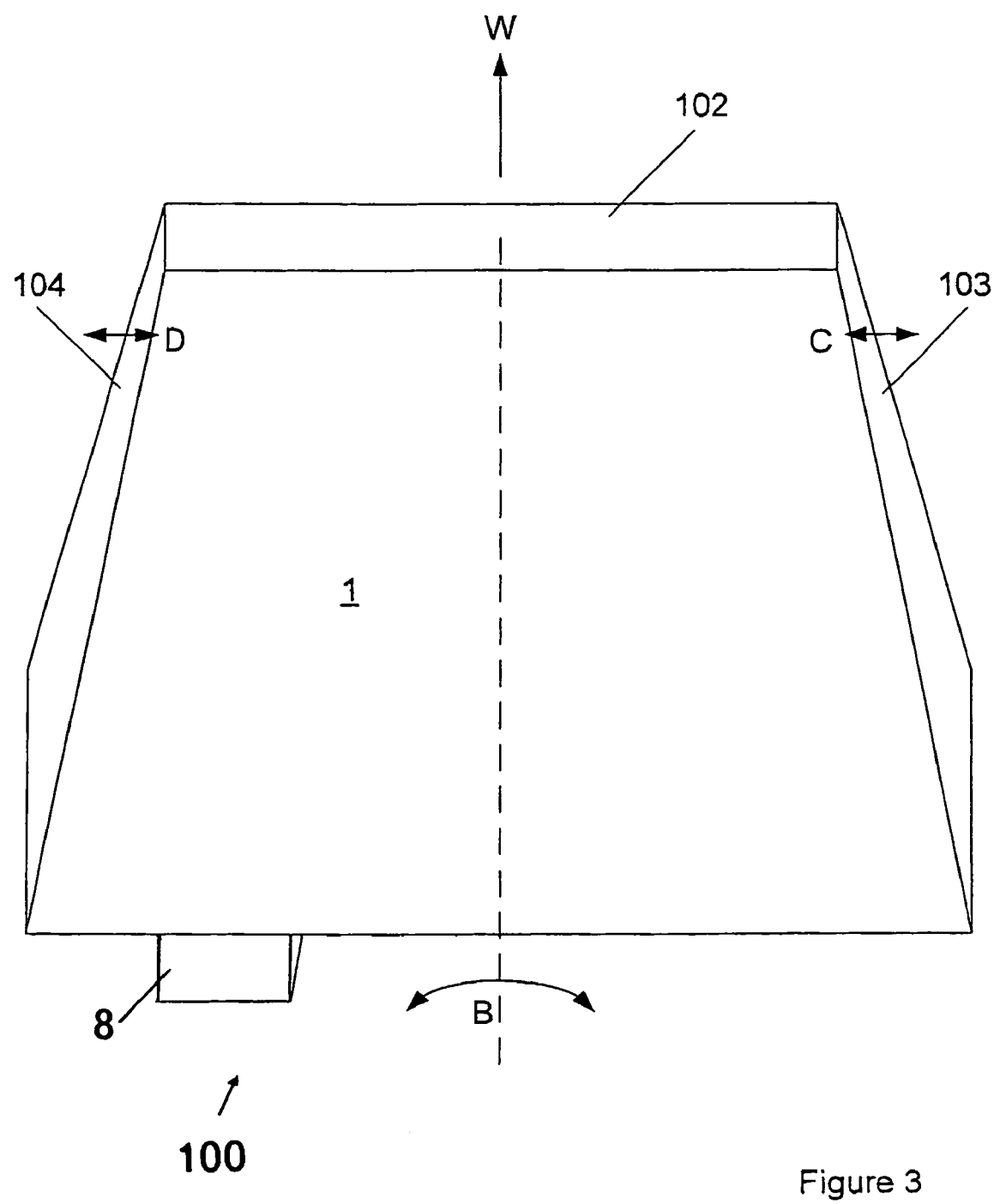
FIG. 3: Shows a schematic end view representation of the wave pool of FIGS. 1 and 2.

The variable floor 1 may fill the pool below its upper surface, in order to compartmentalise the water under the floor and minimise the leakage from under the floor while the waves are breaking. This would add stability to the floor overall, using the underlying layer of water like a sponge to damp out floor movements due to the passage and breaking of waves in the upper layer of water above the floor. Each segment of each group of segments may have a skirt depending down from its periphery to the base of the wave pool, thereby creating a compartment below that segment or group of segments. An example of a skirt 8 is shown in FIG. 3.

The floor profiles may be pre-determined using numerical modelling software that simulates the wave transformation in the pool. Alternatively, the shapes could be set to create particular types of breaking wave intensities, perhaps determined by studies on natural sea beds that are world-class surfing wave sites. However, as indicated herein above, two important characteristics of the variable floor 1 to be varied are the slope of the floor along and across the pool. By providing a pool that has the ability to vary these two slopes, waves having varying characteristics can be produced.

In addition to controlling the profile of the variable floor 1, the side walls 103 and 104 may also be adjusted. As stated herein above, the side walls may converge in the direction of travel of waves, W. The rate of convergence may be adjusted by moving one or both of the side walls 103, 104, as indicated by arrows C and D in FIG. 3. The side walls 103, 104 may optionally be able to be oriented so as to be parallel if required. The side walls 103, 104 may rotate about a substantially central axis in order to maintain a substantially constant pool volume. A seal will also need to be provided between the joins of the side walls and the end walls. The side walls 103, 104 may be moved by one or more rams or other suitable means. The side walls 103, 104 need not be planar and may have local portions in which the rate of convergence can be varied to effect particular wave characteristics adjacent those portions. The size of waves produced by the wave generator 105 may also be controlled and a suitable controller may be provided to control any one or combination of the profile and overall slope of the variable floor 1, the rate of convergence and profile of the side walls 103, 104, and the wave generator 105, thereby providing several degrees of freedom in designing a particular pool and allowing the pool to be changed to generate a wide range of wave types.

The variable floor may be located adjacent a shore to enable control of characteristics of waves approaching the shore. It is anticipated that the embodiment with floating segments in particular could be used in an ocean or lake on a rock reef or artificial created solid substrate. The rocks/firm substrate provides stability to the variable floor. The variable floor may thus be used to create a varying shape reef.

The variable floor 1 may be provided with a custom-made pool or fitted to an existing pool. Plates for collectively defining an upper surface of the wave pool floor, together with adjusting means to locate and adjust the height of the plates relative to the fixed floor may be provided in combination for fitting onto the base of an existing pool. Cabling arrangements and a controller may also be provided to allow remote control of the pool floor, side walls and wave generator as required.

Where in the foregoing description reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. A floor for a body of water, the floor including a base portion for location on or within a fixed floor of the body of water, an upper surface opposing said base portion and means to adjust the slope of said upper surface relative to said fixed floor or base portion in both a first direction and in a second direction transverse to the first direction, wherein the upper surface of the floor is held in position, in use, by a plurality of cables acting against an upward force.

2. The floor of claim 1 wherein the upward force is a buoyancy force.

3. The floor of claim 2, wherein the second direction is substantially parallel to an expected direction of travel of waves over said upper surface.

4. The floor of claim 2, wherein the upper surface is formed by a plurality of segments and the means to adjust the slope of said upper surface is operable to adjust the slope along one or both of said first and second directions for portions of the upper surface by changing the relative height of said segments.

5. The floor of claim 4, wherein the upper surface is formed by a grid of plates having one of a square and triangular shape.

6. The floor of claim 4, wherein each segment is linked to adjacent segments by a pivotal linkage.

7. The floor claim 4, wherein the operation of the means to adjust the slope of said upper surface is controlled by a controller and wherein the controller is programmed to control said means to adjust the slope of said upper surface to provide a selected floor profile from a plurality of pre-determined floor profiles.

8. The floor of claim 4, wherein each segment has a density less than water.

9. The floor of claim 4, wherein the means to adjust the slope of said upper surface is operable to create local variations in the slope of the floor by adjusting the height of one of individual segments and groups of segments.

10. The floor of claim 2, wherein the floor includes walls below the upper surface that compartmentalize the area below the upper surface.

11. A wave pool including a floor as claimed in claim 2.

12. The wave pool of claim 11 including side walls oriented so as to converge in the direction of travel of waves within the wave pool.

13. The wave pool of claim 12, including means to adjust the rate of convergence of the side walls.

14. The wave pool of claim 13, wherein the means to adjust the slope of said upper surface and the means to adjust the rate of convergence of the side walls are both operable under the control of a controller, the controller including in memory a number of pre-set configurations for the floor and side walls.

15. The wave pool of claim 14, including a wave generator operable to generate waves that travel over the floor, wherein the wave generator is controllable to generate varying wave sizes.

16. The floor of claim 1 including an elastic sheet covering said upper surface, wherein the elastic sheet conforms to the shape of the upper surface.

17. The floor of claim 16, wherein the elastic sheet is formed by or covers an impact-absorbing material.

18. The floor of claim 16, wherein the upper surface includes a heat insulating material.

19. A method of controlling characteristics of waves travelling through a body of water, the method including providing a floor for the body of water that has an upper surface that is held in position, in use, by a plurality of cables acting against an upward force, wherein the upper surface is controllably variable in slope in both a first direction and a second direction transverse to the first direction such that the slope of either of said first and second directions can be adjusted independently of the slope in the other said direction, the method further including the step of adjusting the slope of said upper surface along said first and second directions as required to effect particular wave characteristics.

20. The method of claim 19 wherein the upward force is a buoyancy force.

21. The method of claim 20 including effecting particular wave characteristics by identifying a required slope substantially along the expected direction of travel of waves over the floor and substantially transverse to the expected direction of travel of waves over the floor and adjusting the slope of said upper surface to achieve the identified slopes.

22. The method of claim 20, wherein the body of water is a wave pool and the method includes providing moveable side walls that converge in the direction of travel of waves in the wave pool and adjusting the rate of convergence of the side walls as required to effect particular wave characteristics.

23. The method of claim 20, wherein the floor is constructed from a grid of controllably movable floor segments and the method further includes adjusting the relative height of the floor segments to create local variations in slope in the pool floor to effect a change in wave characteristics proximate the local variations in slope in the pool floor.

24. The method of claim 20, further including providing adjustment means for the upper surface that is automatically and remotely controllable and controlling the adjustment means by a controller having a number of predetermined floor profiles stored in a memory.

25. A wave pool including a floor having an upper surface and means to adjust the slope of said upper surface in a direction having a substantial component transverse to the direction of travel of waves within the wave pool, wherein the upper surface of the floor is held in position, in use, by a plurality of cables acting against an upward force.

26. The wave pool of claim 25 including moveable side walls able to be oriented so as to converge in the direction of travel of waves in the wave pool and means to adjust the rate of convergence of the side walls.

27. The wave pool of claim 25, wherein the floor is constructed from a grid of controllably movable floor segments and the means to adjust the slope of said upper surface is operable to adjust the relative height of the floor segments to create local variations in slope in the pool floor.

28. A method of controlling wave characteristics in a body of water, the method including providing a floor for the body of water that has an upper surface that is controllably variable in slope in at least a first direction having a substantial transverse component to the direction of travel of waves in the body of water, wherein the upper surface of the floor is held in position, in use, by a plurality of cables acting against an upward force, the method including the step of adjusting the slope of said upper surface in said first direction as required to effect particular wave characteristics.

29. The method of claim 28, wherein the body of water is a wave pool and the method includes providing moveable side walls that converge in the direction of travel of waves in the wave pool and adjusting the rate of convergence of the side walls as required to effect particular wave characteristics.

30. The method of claim 28, wherein the floor is constructed from a grid of controllably movable floor segments and the method further includes adjusting the relative height of the floor segments to create local variations in slope in the pool floor to effect a change in wave characteristics proximate the local variations in slope in the pool floor.

31. A floor for a body of water, the floor including a base portion for location on or within a fixed floor of the body of water, an upper surface formed by a plurality of segments opposing said base portion, the segments being movable so that the slope of said upper surface relative to said fixed floor or base portion is variable in both a first direction and in a second direction that is substantially parallel to an expected direction of travel of waves over said upper surface and transverse to the first direction, wherein the upper surface of the floor is held in position, in use, by a plurality of cables acting against an upward force.

32. The floor of claim 31 wherein the upward force is a buoyancy force.

33. The floor of claim 32, wherein the segments are movable so as to create local variations in the slope of the upper surface.

34. The floor of claim 33, wherein the upper surface is covered by an elastic material.

35. A wave pool comprising a wave pool generator to generate waves in a body of water that travel in a first direction over a floor for the body of water, the floor including a base portion, an upper surface opposing said base portion and formed by a plurality of segments, wherein the segments are movable so that the slope of said upper surface relative to said base portion is variable at least in a direction substantially transverse to the first direction, and wherein the upper surface of the floor is held in position, in use, by a plurality of cables acting against an upward force.

36. The wave pool of claim 35 wherein the upward force is a buoyancy force.

37. The wave pool of claim 36, wherein the segments are movable so that the slope of said upper surface relative to said base portion is variable in a direction substantially parallel to the first direction.

38. The wave pool of claim 37, wherein the segments are movable to create local variations in the slope of the floor.

39. A method of controlling wave characteristics in a wave pool, the method comprising providing a floor for the wave pool that has an upper surface that is controllably variable in slope in a first direction that is substantially parallel to the expected direction of travel of waves in the wave pool, wherein the upper surface of the floor is held in position, in use, by a plurality of cables acting against an upward force, the method including providing opposing side walls that are movable to provide a controllably variable rate of convergence in the direction of travel of waves in the wave pool and adjusting the slope of said upper surface along said first direction and adjusting the rate of convergence of said side walls as required to effect particular wave characteristics.

40. The method of claim 39 wherein the upward force is a buoyancy force.

41. The method of claim 40, wherein said upper surface is controllably variable in slope in a second direction transverse to the first direction and the method comprises adjusting the slope of said upper surface along said second direction to assist in effecting particular wave characteristics.

42. The method of claim 41, further comprising creating local variations in wave characteristics by creating local variations in the slope of the pool floor.

* * * * *